Jan. 19, 1960     C. W. CAIRNES     2,921,764
ADJUSTABLE PEDESTAL FOR MOUNTING PRECISION AND POWER EQUIPMENT
Filed Oct. 9, 1958     2 Sheets-Sheet 1
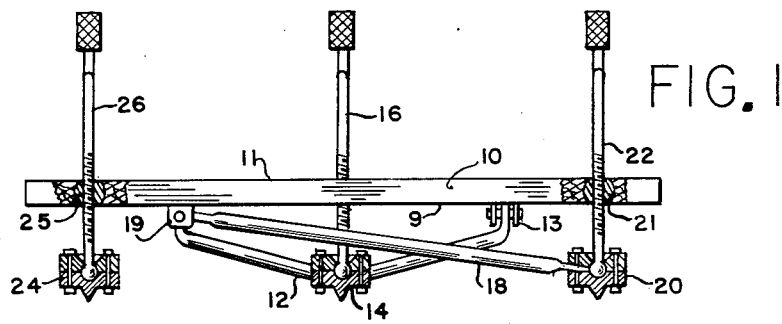
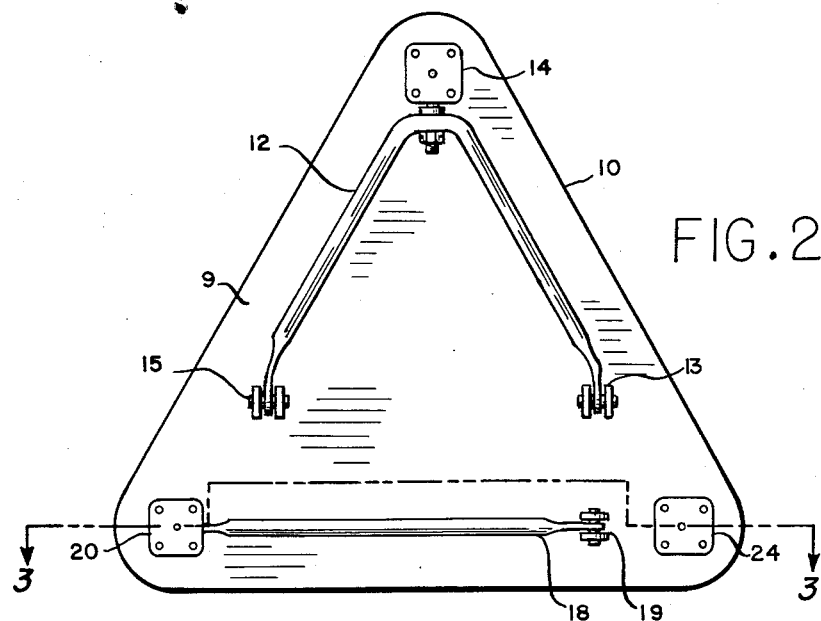
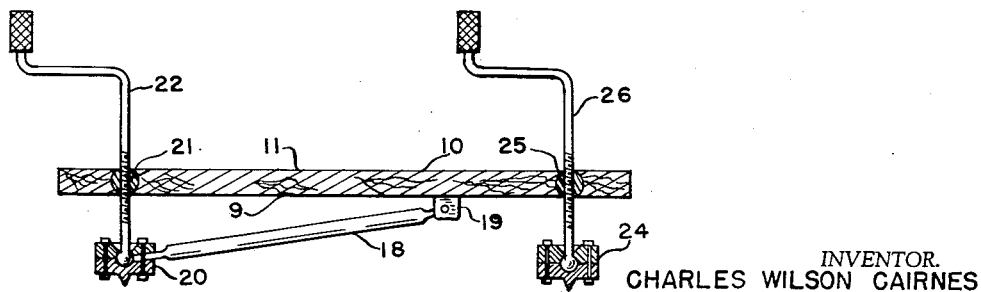
INVENTOR.
CHARLES WILSON CAIRNES
ATTORNEYS

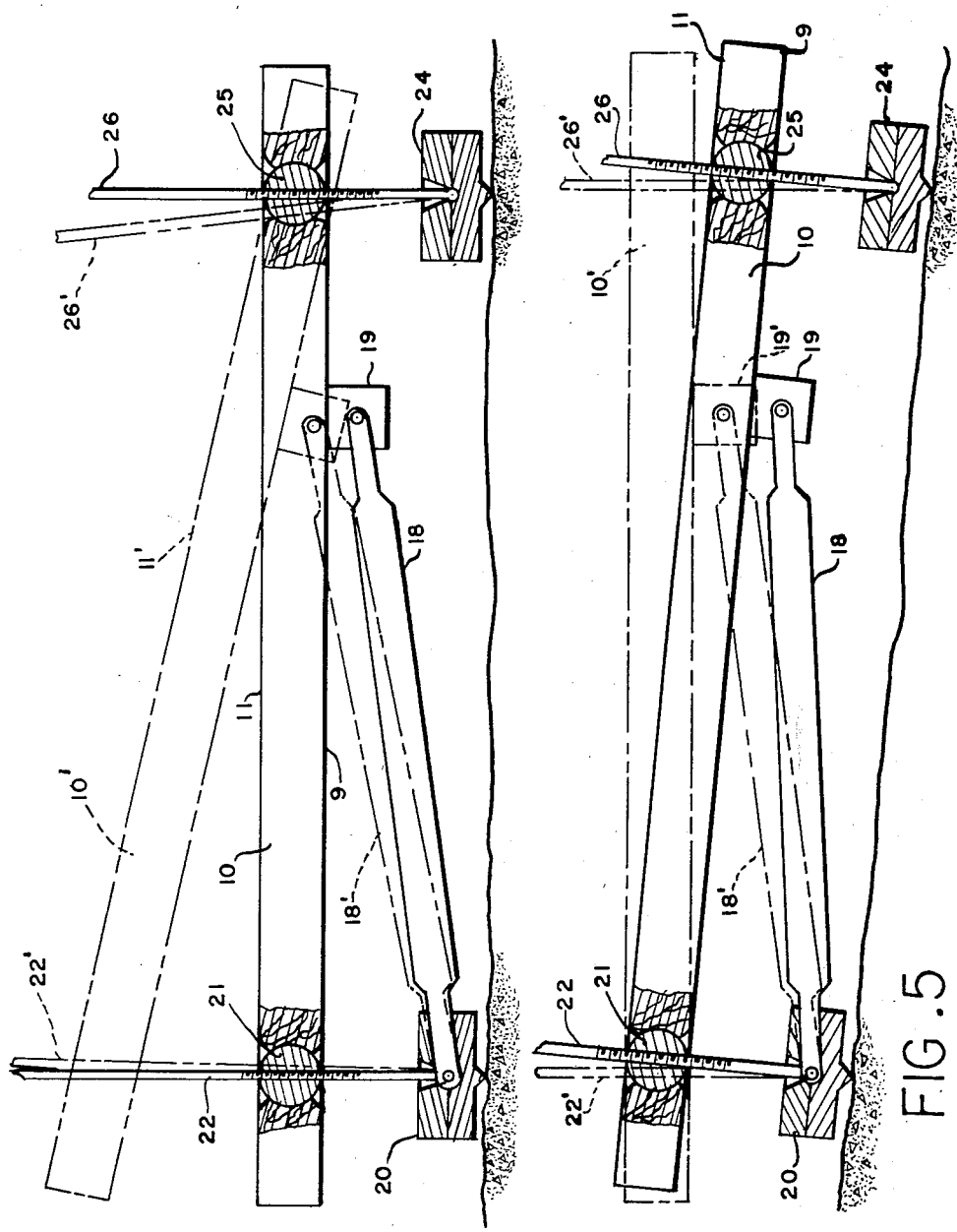

United States Patent Office 2,921,764
Patented Jan. 19, 1960

2,921,764

ADJUSTABLE PEDESTAL FOR MOUNTING PRECISION AND POWER EQUIPMENT

Charles W. Cairnes, Indialantic, Fla., assignor to the United States of America as represented by the Secretary of the Air Force Application October 9, 1958, Serial No. 766,368

2 Claims. (Cl. 248—163)

This invention relates to an adjustable pedestal or platform for mounting precision or power equipment where steadiness and freedom from vibration are important. It is adaptable to light instruments such as a surveyor's transit or level or to heavy apparatus such as a radar antenna or a gun mount. The pedestal or platform is completely stable due to the novel use of a triangular prism truss and is not dependent upon massive parts or accurate machining for its stability.

The ordinary method employed for levelling a pedestal or mount is to adjust the length of its legs by screws or other means which transfers any load to the floor through bending of the legs. This produces a flexible mount subject to deflections and vibrations. Furthermore, an adjustment of one leg loads the other legs laterally causing bending or skidding of the legs on the floor.

It is an object of this invention to provide a pedestal or mount which is stable throughout its range of adjustment.

It is a further object to provide an adjustable pedestal or mount which is simple in operation and economical to manufacture.

It is a further object to provide an adjustable pedestal or mount which is free from sway or vibration without the use of massive parts.

It is a further object of this invention to provide a stable, vibrationless and adjustable pedestal or mount free from sway using struts to reduce all loads from torsion and bending to pure tension and compression.

Briefly, this invention is a vertically adjustable tripod type of support with each leg comprising a jack screw threadedly engaging a ball forming part of the ball and socket joint connecting the legs to the pedestal or platform, each jack screw terminating in a ball and socket joint in a foot or pad. In order to prevent collapse of the platform or mount due to the ball and socket joints and to eliminate stresses on the legs during vertical adjustment of the platform, the legs are braced to the platform by an arrangement of trusses swivelably connecting the legs to the under surface of the platform so that it is stabilized in all directions.

With the above and other objects and features in view, the invention will now be described, with particular reference to the accompanying drawings in which:

Fig. 1 is an elevation view in section;

Fig. 2 is a plan view showing the underside of the pedestal or platform;

Fig. 3 is an elevation view in section taken along line 3—3 of Fig. 2 showing two of the adjustable legs and a single strut;

Fig. 4 is a sectional view showing how the platform may be raised; and

Fig. 5 is a sectional view showing how the platform may be levelled when the device is placed on uneven ground or a slanting floor.

In the drawings, the numeral 10 designates a pedestal, platform or mount, having a bottom surface 9 and a top surface 11 which may be of any suitable material. A yoke strut 12 is pivotally attached to the platform 10 at spaced points 13 and 15 and to a pad 14. The pad 14 is attached by a ball and socket joint to a jack 16 which is threaded into an internally threaded ball, held in a socket joint secured in pedestal 10 similar to ball and socket joints shown at 21 and 25. Thus the triangular yoke strut 12 stabilizes the pad 14 in all directions and since said yoke strut 12 is pivotally connected to the said pedestal 10 and to the pad 14, the structure is rigid and can only move in a circular direction around pad 14 as a center. The pad 20 is stabilized by single strut 18 and jack 22 and since the strut is pivotally connected to the platform at 19 and the jack 22 by a ball and socket joint 21, the structure is prevented from moving in a direction parallel to the strut 18. The pad 24 is stabilized only by jack 26 and consequently only vertical motion is restricted at this location. Adjustment of the jack 16 over the pad 14 will cause lateral motion of the platform 10 with relative motion between the platform 10 and the pads 20 and 24, but because of the trusses 12 and 18 the structure will always be in equilibrium and completely stable.

As shown in Figs. 4 and 5, the vertical movement of the pedestal 10 is usually very slight, and little perceptible change in the angle of the jacks 22 and 26 takes place in raising the pedestal to a level condition, as in Fig. 5, or to a slanting position, as in Fig. 4, and there is no torsion or bending load placed on the jacks, which correspond to the legs of a conventional pedestal or platform.

Adjustment of the mount is simple and straightforward. As one corner of the platform is raised or lowered in levelling, the structure moves in an easy circular motion with no bending or torsion, all loads being taken up in pure compression or tension.

And now having described my invention what I claim and pray for a United States Patent is:

1. An adjustable pedestal for mounting precision or power apparatus comprising a platform, three jackscrews extending through socket joints at spaced points in said platform, supporting pads for said platform, said jackscrews terminating in ball and socket joints in said supporting pads, one of said pads being swivelably connected to said platform through a yoke to stabilize said pad and platform in all directions, one of said pads being connected swivelably through a strut to said platform to stabilize said pad and platform in a direction parallel to said strut, and the third of said pads being connected to said platform only through the jackscrew connected therewith, said jackscrews and said yoke and strut being effective to level said platform without causing bending stresses to the parts.

2. An adjustable pedestal for mounting and levelling precision and power equipment comprising a platform, means for raising and lowering said platform located at three spaced points in said platform, ball and socket joints at said points threadedly engaged with said raising and lowering means and arranged upon rotating said means to raise or lower said platform, pads swivelably connected to said raising and lowering means, a yoke pivotally connected at spaced points to said platform and to one of said pads to stabilize said pad and said platform in all directions, a strut pivotally connected to said platform and to one of said pads to stabilize said platform and said pad in a direction parallel to said strut, the third raising and lowering means being connected to the third pad to restrict the said platform to vertical motion, said raising and lowering means being effective to level said platform without imparting bending stresses to the parts.

References Cited in the file of this patent

UNITED STATES PATENTS 590,636     Walter                Sept. 28, 1897
737,755     Marceau              Sept. 1, 1903